Sept. 22, 1925.
T. RANTTILA
ANIMAL TRAP
Filed April 8, 1925
1,554,295
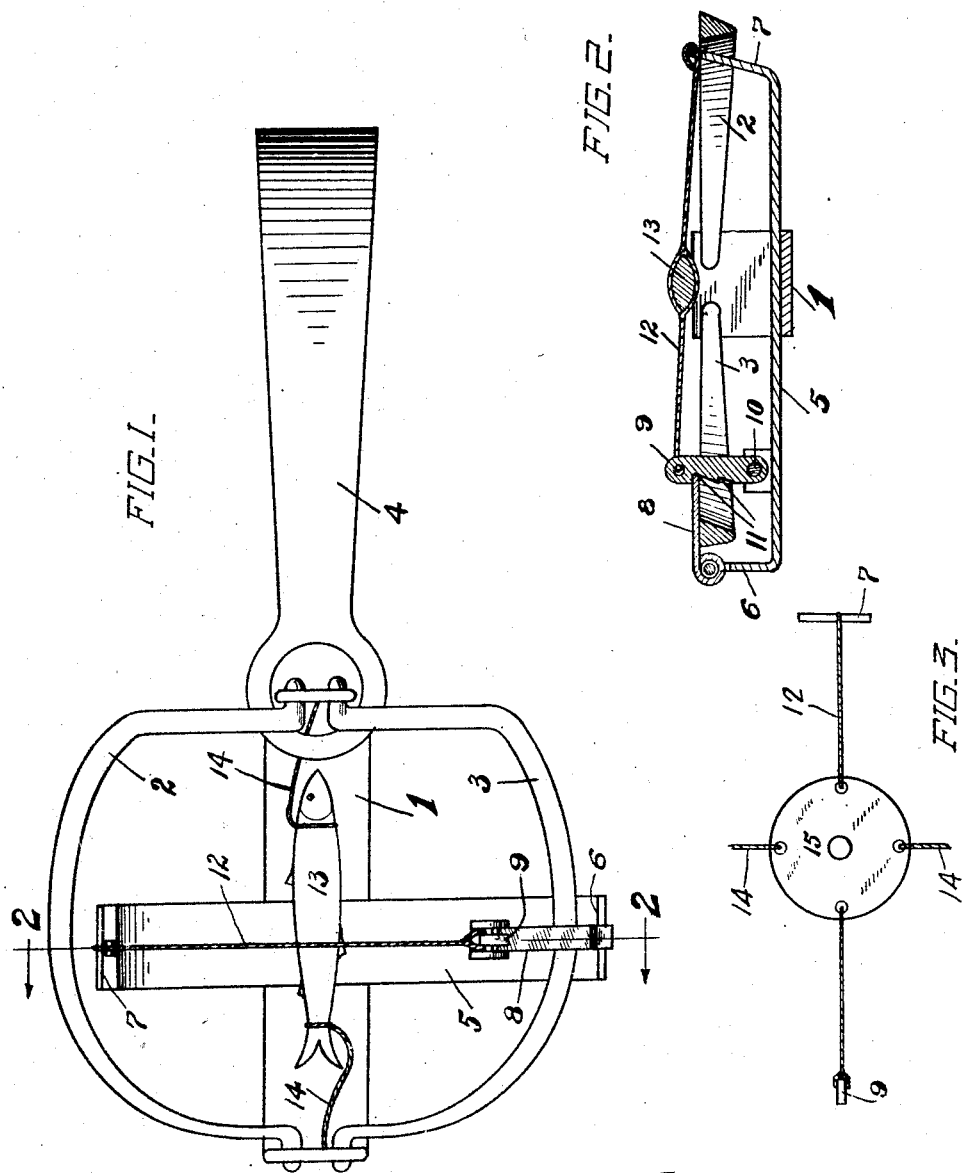
Inventor
Tuomas Ranttila
By Frederick C. Bromley
Atty Patented Sept. 22, 1925.

1,554,295

UNITED STATES PATENT OFFICE.

TUOMAS RANTTILA, OF ALLAN WATER, ONTARIO, CANADA.

ANIMAL TRAP.

Application filed April 8, 1925. Serial No. 21,586.

*To all whom it may concern:*

Be it known that I, TUOMAS RANTTILA, a subject of the King of Great Britain, resident of the town of Allan Water, in the Province of Ontario, in the Dominion of Canada, have invented new and useful Improvements in Animal Traps, of which the following is a specification.

The invention relates to improvements in animal traps as described in the present specification and shown in the accompanying drawings which form part of the same.

The invention has for its object to provide a new and useful trap which is baited in such a manner that the removal of the bait will automatically trip the trigger thus releasing the jaws.

The invention consists substantially of an animal trap of the ordinary spring jaw type, to the trigger of which is connected a flexible element which suspends a bait so that upon the animal attempting to remove the same the trigger will be automatically tripped, thus allowing the jaws to snap and secure the animal.

In the drawings, Figure 1 is a plan view of the trap, baited and set.

Figure 2 is a sectional view thereof taken on the line 2—2 of Figure 1.

Figure 3 is a plan view of a bait-suspension, showing a slightly modified form of the invention.

Like numerals of reference indicate corresponding parts of each figure throughout the drawings.

Referring to the drawings: The reference numeral 1 indicates the frame of the trap, which is provided with the usual jaws 2 and 3 which are urged to a closed position by a substantial spring 4.

5 designates the transverse member of the frame having upturned ends 6 and 7. Connected to the end 6 is a pivoted keeper 8 which is arranged to pass over one of the jaws in its open position and engage a trigger 9 which is pivoted at 10. This keeper is engageable in either one or the other of a pair of notches 11 cut in the trigger 9, one of such notches being of a slightly greater depth than the other in order to vary the sensitiveness of the releasing apparatus.

12 is a flexible element secured to the free end of the trigger and extending transversely of the jaws with its other end secured to the portion 7 of the member 5. This flexible member is of such a length that it is drawn taut when the trigger is in an engaged position.

Suspended intermediate of the length of this flexible element is a bait 13, such as a natural fish as illustrated in Figure 1, and further securing this fish are flexible elements 14 extending to the frame 1 and secured thereto in any convenient manner.

By this construction, it will be evident that upon the jaws being opened and set by the trigger 9 and its keeper, the bait will be pulled taut, so that when an animal grasps or in any way attempts to remove this suspended bait it will pull upon the flexible element 12 thus disengaging the trigger from its keeper and snapping the trap jaws about the animal.

In the modified form of the invention shown in Figure 3, a pan 15 is illustrated which is an alternative form of bait suspending means to that depicted in Figures 1 and 2, and is suspended intermediate of the trigger 9 and the end 7 by means of the flexible elements as previously described. This pan is for the purpose of receiving the bait which may be attached thereto in any convenient manner.

It will be apparent that in the use of the invention the animal being trapped has to lower its head within the closing area of the trap jaws; in its eagerness to remove the bait, the tussle must inevitably result in the instantaneous releasing of the jaws which by snapping upon the creature's head will have a tendency to kill it outright, rather than, as in other spring jaw traps, merely catching it by the leg or foot, in which event the animal is often found to chew off the broken or cut member in order to release itself from the trap.

What I claim is:—

1. In a trap of the class described, a frame, a pair of spring-urged jaws mounted therein, a keeper, a trigger engageable therewith, a bait holding pan, and flexible elements securing said pan to the frame and trigger for suspension therebetween when the trigger is engaged with the aforesaid keeper.

2. In a trap of the class described, a frame including a transverse member having upturned ends, a pair of spring-urged jaws mounted in said frame arranged when open to spread over said transverse member, a keeper pivoted in an end of said transverse member, a trigger likewise carried by said member, said trigger being provided with notches of varying depths for engagement with the free terminus of the keeper, a bait holding pan, and flexible elements securing said pan to the other end of the transverse member and said trigger, the said flexible elements being of such a length that they are pulled taut and the pan sustained when the trap is set.

Signed at town of Sioux Lookout, Canada, this sixteenth day of March, 1925.

TUOMAS RANTTILA.